United States Patent

Grimm et al.

[11] Patent Number: 6,102,560

[45] Date of Patent: Aug. 15, 2000

[54] SCREW TIP FOR CLOSING A TEMPERATURE-CONTROL BORE OF AN EXTRUDER SCREW

[75] Inventors: Robert Grimm, Jetzendorf; Stefan Nikolaus, Stockdorf, both of Germany

[73] Assignee: Krauss-Maffei Kunststofftechnik GmbH, Munich, Germany

[21] Appl. No.: 09/215,835

[22] Filed: Dec. 17, 1998

Related U.S. Application Data

[63] Continuation of application No. PCT/EP98/01087, Feb. 26, 1998.

[30] Foreign Application Priority Data

Apr. 17, 1997 [DE] Germany ................................ 19716127
Feb. 26, 1998 [WO] WIPO ...................... PCT/EP98/01087

[51] Int. Cl.⁷ ....................................................... B29B 7/82
[52] U.S. Cl. ..................... 366/79; 366/147; 425/192 R; 425/378.1
[58] Field of Search ................................ 366/79–90, 144, 366/147, 186, 318–324, 331, 349; 425/192 R, 378.1, 204, 208, 209

[56] References Cited

U.S. PATENT DOCUMENTS

| | | |
|---|---|---|
| 2,622,469 | 12/1952 | Gray . |
| 2,653,348 | 9/1953 | Elgin et al. . |
| 2,688,770 | 9/1954 | Henning . |
| 3,698,694 | 10/1972 | Zeug et al. . |
| 3,870,451 | 3/1975 | Gokcen .................................. 425/378.1 |
| 4,243,629 | 1/1981 | Tramezzani . |
| 4,477,242 | 10/1984 | Eichlseder et al. ......................... 366/79 |
| 4,530,605 | 7/1985 | Eichlseder et al. ......................... 366/79 |
| 4,697,928 | 10/1987 | Csongor . |
| 4,734,240 | 3/1988 | Chung et al. .......................... 425/378.1 |
| 5,843,489 | 12/1998 | Nakano .................................. 425/208 |

FOREIGN PATENT DOCUMENTS

| | | |
|---|---|---|
| 846 012 | 10/1951 | Germany . |
| 12 67 833 | 5/1968 | Germany . |
| 22 04 055 | 8/1972 | Germany . |
| 22 30 771 | 8/1974 | Germany . |
| 23 11 717 | 9/1974 | Germany . |
| 23 40 499 | 1/1975 | Germany . |
| 29 24 462 | 1/1981 | Germany . |
| 62-60608 | 3/1987 | Japan ........................................ 366/79 |
| 209714 | 3/1968 | U.S.S.R. ................................. 366/147 |
| 979 194 | 1/1965 | United Kingdom . |

*Primary Examiner*—Charles E. Cooley
*Attorney, Agent, or Firm*—Henry M. Feiereisen

[57] ABSTRACT

An extruder screw, includes a head portion having a front end and having formed therein a temperature-control bore and a counterbore extending the bore to the front end for supply and drainage of a fluid. A locking screw has a screw thread, with a first section of the screw thread received in the bore and a second section of the screw thread extending in the counterbore and projecting out of the head portion. The extruder screw further includes a screw tip which threadably engages the second section of the screw thread to close off the extruder screw, and a sealing member which is received in a counterbore of the head portion, wherein the locking screw is so configured as to apply a substantial force against the sealing member when engaging the locking screw into the bore, to thereby effectively seal the bore.

4 Claims, 1 Drawing Sheet

SCREW TIP FOR CLOSING A TEMPERATURE-CONTROL BORE OF AN EXTRUDER SCREW

CROSS-REFERENCES TO RELATED APPLICATIONS

This application is a continuation of prior filed copending PCT International application no. PCT/EP98/01087, filed Feb. 26, 1998.

This application claims the priority of German Patent Application Ser. No. 197 16 127.8, filed Apr. 17, 1997, the subject matter of which is incorporated wherein by reference.

BACKGROUND OF THE INVENTION

The present invention relates in general to an extruder screw, and in particular to an extruder screw of a type having a front end and formed therein a temperature-control bore extending to the front end for supply and drainage of free-flowing temperature-control fluid, and a screw tip threadably engaging the front end of the extruder screw at interposition of at least one seal for sealing off the forwardly open temperature-control bore.

In conventional extruder screws of this type, the screw tips to be attached to the front end of the extruder screw are provided on the tip-distal end with a thread and with a cylindrical part which is formed with ring grooves for receiving O rings. Only small forces can be applied via frictional engagement on the cylindrical area of the screw tip to threadably engage such screw tips. Furthermore, the cylindrical areas between screw part and screw tip must be made at high precision in order to assure the required sealing action of the O rings arranged in the cylindrical part.

SUMMARY OF THE INVENTION

It is thus an object of the present invention to provide an improved extruder screw, obviating the afore-stated drawbacks.

In particular, it is an object of the present invention to provide an improved extruder screw of the above-stated type which improves the effectiveness of the seal arranged between screw part and screw tip while eliminating the need for precision fitting.

These objects, and others which will become apparent hereinafter, are attained in accordance with the present invention by providing an extruder screw with a head portion which has a front end and is formed with a bore and a counterbore to thereby extend the bore to the front end for supply and drainage of a fluid, a locking screw having a screw thread, with a first section of the screw thread threadably received in the bore and a second section of the screw thread extending in the counterbore and projecting out of the head portion, a screw tip threadably engaging the second section of the screw thread, and a sealing member received in a counterbore of the front portion, wherein the locking screw is so configured as to apply a substantial force against the sealing member when engaging the locking screw into the bore.

Preferably, the locking screw is provided with a collar to separate the first and second sections of the screw thread, and to press against the sealing member when the locking screw is engaged in the bore.

According to another feature of the present invention, the locking screw has a hexagonal head for engagement by a suitable tool for tightening the locking screw in the bore.

Through the provision of a locking screw for sealing the temperature-control bore and attachment of the screw tip to the locking screw, the operativeness of the extruder screw 11 is realized by two components of comparably simple design, i.e. the locking screw to realize a secure sealing of the temperature-control bore, and the screw tip to close the extruder screw.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
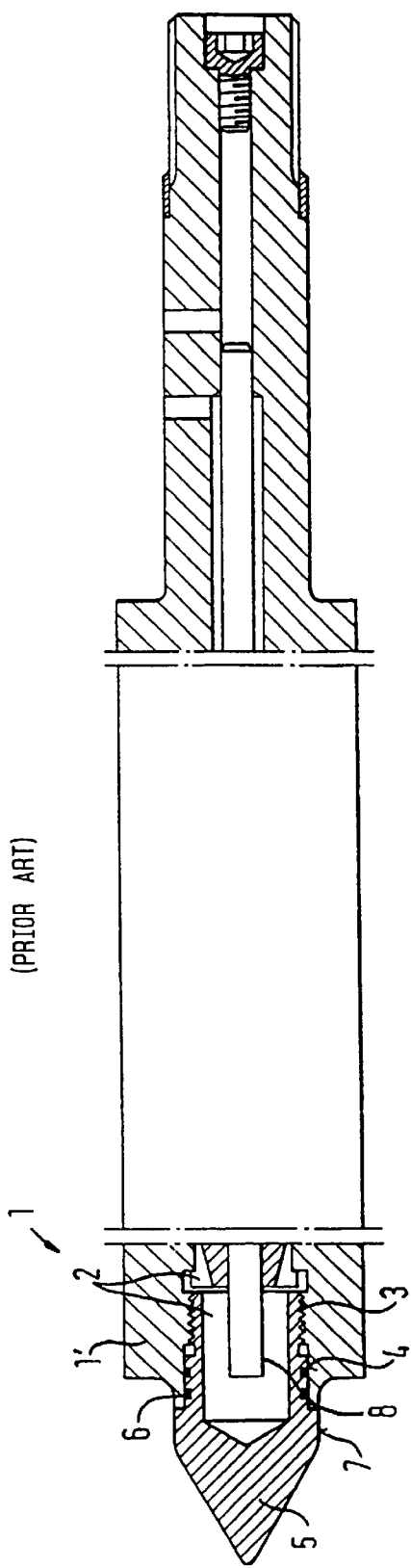
FIG. 1 is a sectional view of a conventional extruder screw.

Turning now to the drawing, and in particular to FIG. 1, there is shown a sectional view of a conventional extruder screw 1 which has a front head portion 1' and a screw tip 7 for cooperation with the head portion 1'. Formed in the head portion 1' is a temperature-control bore 2 which is open towards the front end for receiving a displacement pipe 8 for supply and drain of a liquid temperature-control fluid. In the forwardly open temperature-control bore 2, the head portion 1' of the extruder screw 1 is provided with an internal thread 3 and an engagement surface 4. The temperature-control bore 2 is closed by threadably engaging the screw tip 5 into the internal thread 3 of the head portion 1', with the screw tip 5 having two ring grooves for accommodating O rings 6 which bear upon the engagement surface 4. During extrusion operation, the O rings 6 must withstand extremely high pressure loads and temperature loads. Thus, in order to assure a sufficient sealing action, the ring grooves for the O rings 6 and the engagement surface 4 as well as the complementary engagement surface on the screw tip 5 must be made with very high precision. Moreover, only very small forces can be applied to threadably engage the screw tip 5 via frictional engagement upon the cylindrical area 7 of the screw tip.

Figure 2:
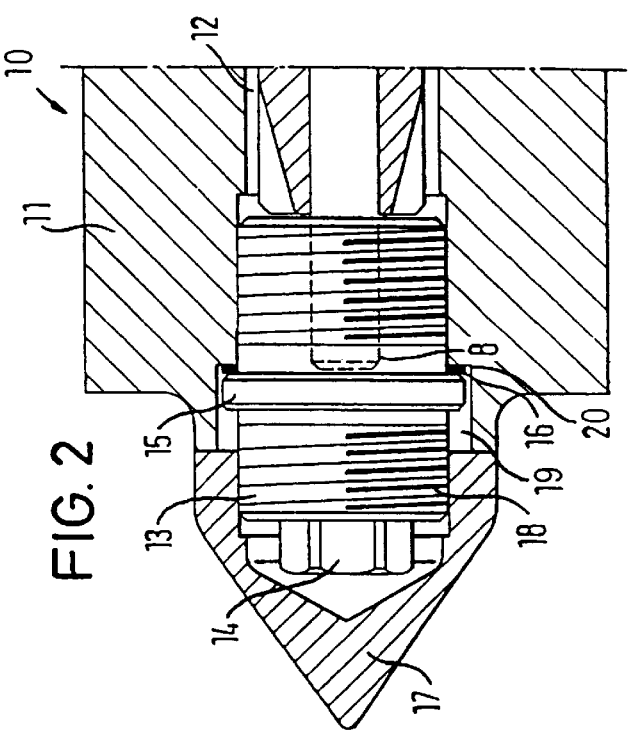
FIG. 2 is a cutaway sectional view of an extruder screw according to the present invention, illustrating in detail a front end of the extruder screw on an enlarged scale.

Turning now to FIG. 2, there is shown a cutaway sectional view of an extruder screw according to the present invention, generally designated by reference numeral 10. The extruder screw 10 has a front head portion 11 which has formed therein a temperature-control bore 12 and a counterbore 19 to thereby provide a flat bottom 20. Positioned on the bottom 20 is an axial seal 16. The bore 12 is closeable by a locking screw 13 which has suitably formed areas, e.g. a hexagonal head 14, for positive engagement by a suitable screwing tool, such as a wrench, and a screw thread 18. Mounted to the screw thread 18 at a distance to the head 14 is a collar ring 15 which interacts with the axial seal 16. Thus, when tightening the locking screw 13 in the bore 2 by applying a tool on the head 14, the collar ring 15 is pressed against the axial seal 16 at a high tightening force and a correspondingly high pressing force to thereby securely seal the bore 2.

The extruder screw 10 is further provided with a screw tip 17 which has a smooth outer surface and is formed with an internal thread to mesh with the section of the screw thread 18 adjacent the head 14 of the locking screw 13. Thus, the screw tip 17 solely assumes the function to close off the extruder screw 11.

While the invention has been illustrated and described as embodied in a screw tip for closing a temperature-control bore, it is not intended to be limited to the details shown since various modifications and structural changes may be made without departing in any way from the spirit of the present invention.

What is claimed as new and desired to be protected by Letters Patent is set forth in the appended claims:

What is claimed is:

1. An extruder screw having a front end and having formed therein an inner temperature-control bore which extends to the front end for supply and drainage of free-flowing temperature-control fluid, and a screw tip closing the forwardly open temperature-control bore and threadably engaging in the front end of the extruder screw at interposition of at least one seal, wherein the forwardly open temperature-control bore (12) provided in the front end of the extruder screw (11) is closed by means of a locking screw (13) at interposition of an axial seal (16), with the locking screw (13) having formed areas for positive engagement of screwing tools, and an external thread (18) to which the screw tip (17) is screwed.

2. An extruder screw, comprising:

a head portion having a front end and having formed therein a bore and a counterbore extending the bore to the front end for supply and drainage of a fluid;

a locking screw having a screw thread, with a first section of the screw thread received in the bore and a second section of the screw thread extending in the counterbore and projecting out of the head portion;

a screw tip threadably engaging the second section of the screw thread; and a sealing member received in a counterbore of the head portion, said locking screw being so configured as to apply a substantial force against the sealing member when engaging the locking screw into the bore.

3. The extruder screw of claim 2 wherein the locking screw is provided with a collar to separate the first and second sections of the screw thread, said collar being pressed against the sealing member when the locking screw is engaged in the bore.

4. The extruder screw of claim 2 wherein the locking screw has a hexagonal head for engagement by a tool for tightening the locking screw in the bore.

* * * * *